US009474129B2

(12) United States Patent
Fushimi

(10) Patent No.: US 9,474,129 B2
(45) Date of Patent: Oct. 18, 2016

(54) BEHAVIOR MANAGEMENT SYSTEM ARRANGED WITH MULTIPLE MOTION DETECTORS

(71) Applicant: Panasonic Intellectual Property Management Co., Ltd., Osaka (JP)

(72) Inventor: Shigemi Fushimi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/518,081

(22) Filed: Oct. 20, 2014

(65) Prior Publication Data

US 2015/0123545 A1 May 7, 2015

(30) Foreign Application Priority Data

Nov. 1, 2013  (JP) ................................. 2013-228783

(51) Int. Cl.
H05B 37/02  (2006.01)

(52) U.S. Cl.
CPC ...... *H05B 37/0218* (2013.01); *H05B 37/0227* (2013.01); *H05B 37/0272* (2013.01); *Y02B 20/44* (2013.01); *Y02B 20/46* (2013.01)

(58) Field of Classification Search
USPC .......................................... 315/308; 340/541
See application file for complete search history.

(56) References Cited

U.S. PATENT DOCUMENTS

| 7,729,941 B2 * | 6/2010 | Zampini, II | ....... G06Q 30/0241 |
| | | | 705/14.4 |
| 8,258,708 B2 * | 9/2012 | Van De Sluis | .... H05B 37/0227 |
| | | | 315/149 |

FOREIGN PATENT DOCUMENTS

JP        2006-266645 A      10/2006

* cited by examiner

*Primary Examiner* — Thuy Vinh Tran
(74) *Attorney, Agent, or Firm* — Renner, Otto, Boisselle & Sklar, LLP

(57) ABSTRACT

A behavior management system includes a lighting system formed of a light source, a first detector, a second detector, a controller, a storage device and an output device. The light source is configured to light a display space for displaying articles and a passage space facing the display space. The first detector is configured to detect human presence or absence in the passage space. The second detector is configured to detect whether a human passes through or stops in the passage space. The controller is configured to control the light source based on detection results by the first and second detectors. The storage device is configured to store histories of detection results by the first and second detectors. The output device is configured to supply an external management device with histories of detection results by the first and second detectors stored in the storage device.

5 Claims, 3 Drawing Sheets

BEHAVIOR MANAGEMENT SYSTEM ARRANGED WITH MULTIPLE MOTION DETECTORS

CROSS REFERENCE TO RELATED APPLICATIONS

This application claims the benefit and priority of Japanese Patent Application No. 2013-228783, filed on Nov. 1, 2013, the entire contents of which are incorporated herein by reference.

TECHNICAL FIELD

The disclosure relates generally to behavior management systems and, more particularly, to a behavior management system configured to manage human behavior in facilities where a plurality of articles is displayed.

BACKGROUND ART

Conventionally, there has been proposed a showcase including a lighting lamp for illumination in a display space and a control device configured to control the lighting lamp (for example, JP Pub. 2006-266645 (hereinafter referred to as "Document 1")). In a showcase described in Document 1, a control device is configured to control a lighting state of a lighting lamp so that the lighting lamp decreases illuminance in a show room when an approach of a customer(s) is undetected and increases the illuminance in the show room when an approach of a customer(s) is detected.

In the showcase of Document 1, the illuminance in the show room is controlled according to movement of a customer(s). There is however a problem that a way or manner of human behavior around a space including the showcase cannot be comprehended.

SUMMARY OF THE INVENTION

The present invention has been achieved in view of the above circumstances, and an object thereof is to provide a behavior management system capable of comprehending human behavior in facilities at low cost.

In an aspect of the present invention, a behavior management system includes at least one lighting system. The lighting system includes a light source, a first detector, a second detector, a controller and an output device. The light source configured to light a display space for displaying articles and a passage space facing the display space. The first detector is configured to detect human presence or absence in the passage space, and then to output a detection result. The second detector is configured to detect whether a human passes through or stops in the passage space, and then to output a detection result. The controller is configured to control the light source based on the detection results by the first and second detectors. The storage device is configured to store a history of detection results by the first detector and a history of detection results by the second detector. The output device configured to supply a management device with the history of detection results by the first detector and the history of detection results by the second detector stored in the storage device.

In the behavior management system, in order to control an optical output of the light source, the lighting system includes the first detector configured to detect human presence or absence in the passage space, and the second detector configured to detect whether a human passes through or stops in the passage space. The lighting system is output the history of detection results by the first detector and the history of detection results by the second detector stored in the storage device. Accordingly, human behavior in the passage space can be managed based on the histories from the lighting system. As a result, according to the behavior management system, human behavior in facilities can be grasped at low cost by utilizing the first and second detectors of the lighting system without installing an additional sensor in order to detect human behavior.

BRIEF DESCRIPTION OF THE DRAWINGS

The figures depict one or more implementations in accordance with the present teaching, by way of example only, not bay way of limitations. In the figure, like reference numerals refer to the same or similar elements where.

DETAILED DESCRIPTION

A behavior management system in an embodiment is explained with reference to FIGS. 1 to 4. The behavior management system is applied to a retail store such as a convenience store, a drugstore or a supermarket, in which showcases for displaying articles (goods) are placed.

Figure 2A:
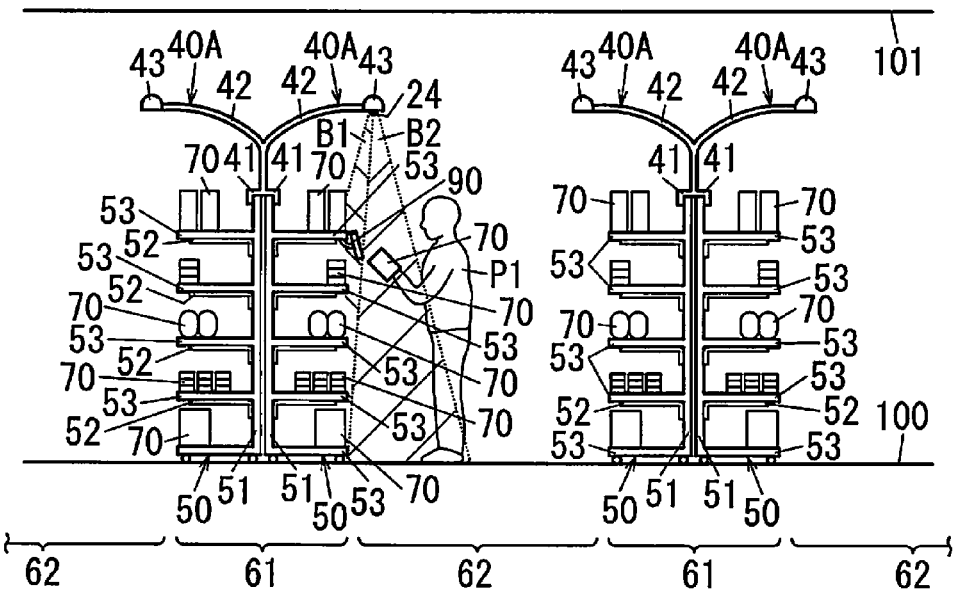
FIGS. 2A and 2B are views illustrating a store to which the behavior management system is applied.
Figure 2B:
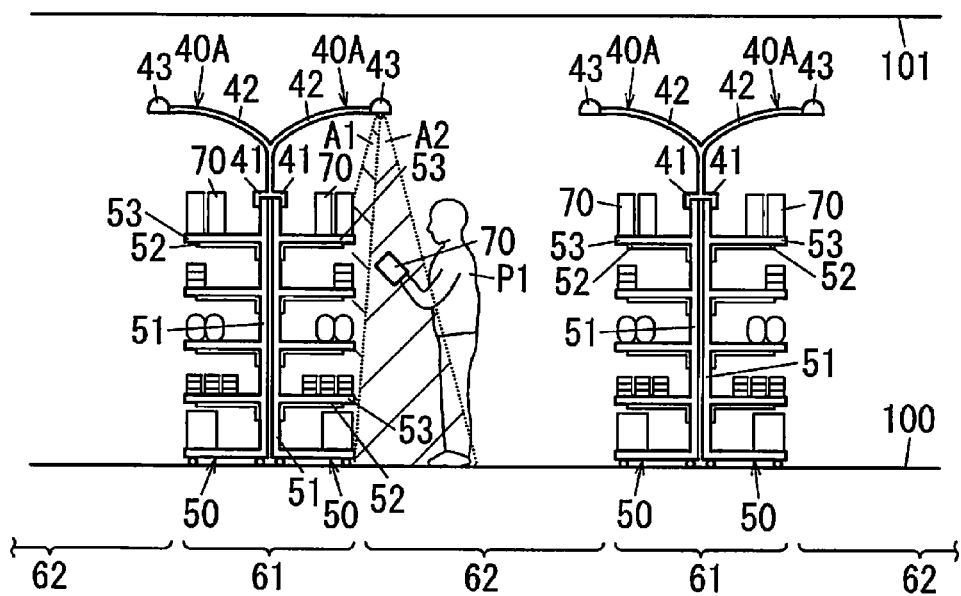

The behavior management system in the embodiment includes at least one lighting system 1 installed in at least one showcase 50. FIGS. 2A and 2B show an example in which showcases 50 are placed in a store. All or part of the showcases 50 may constitute one or more showcase set (see FIG. 4). In an example of FIG. 4, each showcase 50 or each showcase set is placed apart from a wall (not shown) or other showcase 50. Each showcase set includes two showcases 50 arranged back to back. In addition, each of the showcases 50 including the showcase sets defines a display space 61 facing a passage space 62. Therefore, a front (a front side) of each showcase 50 faces a corresponding passage space. Hereinafter, one of the showcases 50 including the showcase sets is explained, and like explanation of the other is omitted.

A showcase 50 is formed of shelf boards 53, pillar members 51, beam members 52 and the like, and has a width, a height and a depth. The shelf boards 53 each have horizontal surfaces at different heights. The pillar members 51 are arranged vertically at back sides of the shelf boards 53 so that the pillar members 51 have spaces between them in width directions of the shelf boards 53. The beam members 52 are each projected from the pillar members 51 to the front side to support the shelf boards 53 from their bottom sides. In an example of FIGS. 2A and 2B, the lowest shelf board 53 is joined to lower ends of the pillar members 51, and remaining shelf boards 53 are supported by the beam members 52. Two or more backboards (not shown) are attached among the pillar members 51.

The showcase 50 is used for displaying articles (goods) 70 such as food, clothing and stationery, and some articles are displayed on each shelf board 53. That is, spaces at upper surface sides of the shelf boards 53 of the showcase 50 constitute a display space 61 for displaying the articles 70.

In the example of FIGS. 2A and 2B, one showcase set includes two showcases 50 arranged back to back, and two showcase sets are arranged so that they have a prescribed space (a passage space) between them and their width directions are parallel with each other. An open space in front of each showcase 50 is a passage space 62 for people to walk on. That is, a display space 61 for displaying articles 70 of each showcase 50 faces a passage space 62.

However, the structure of the showcase 50 for displaying articles 70 is not limited to the structure shown in FIGS. 2A and 2B. Kinds, materials, color tones, sizes and the like of members constituting the showcase 50 can be appropriately modified. For example, each shelf board 53 may be formed of a light guide plate. In the example of FIGS. 2A and 2B, articles 70 are placed on each shelf board 53, but a display form for articles 70 is not limited to the example. Examples of the display form include a display form in which articles 70 are hanged on hooks, and a display form in which articles 70 are hanged from an upside. Utensils according to a display form may be used.

Figure 1:
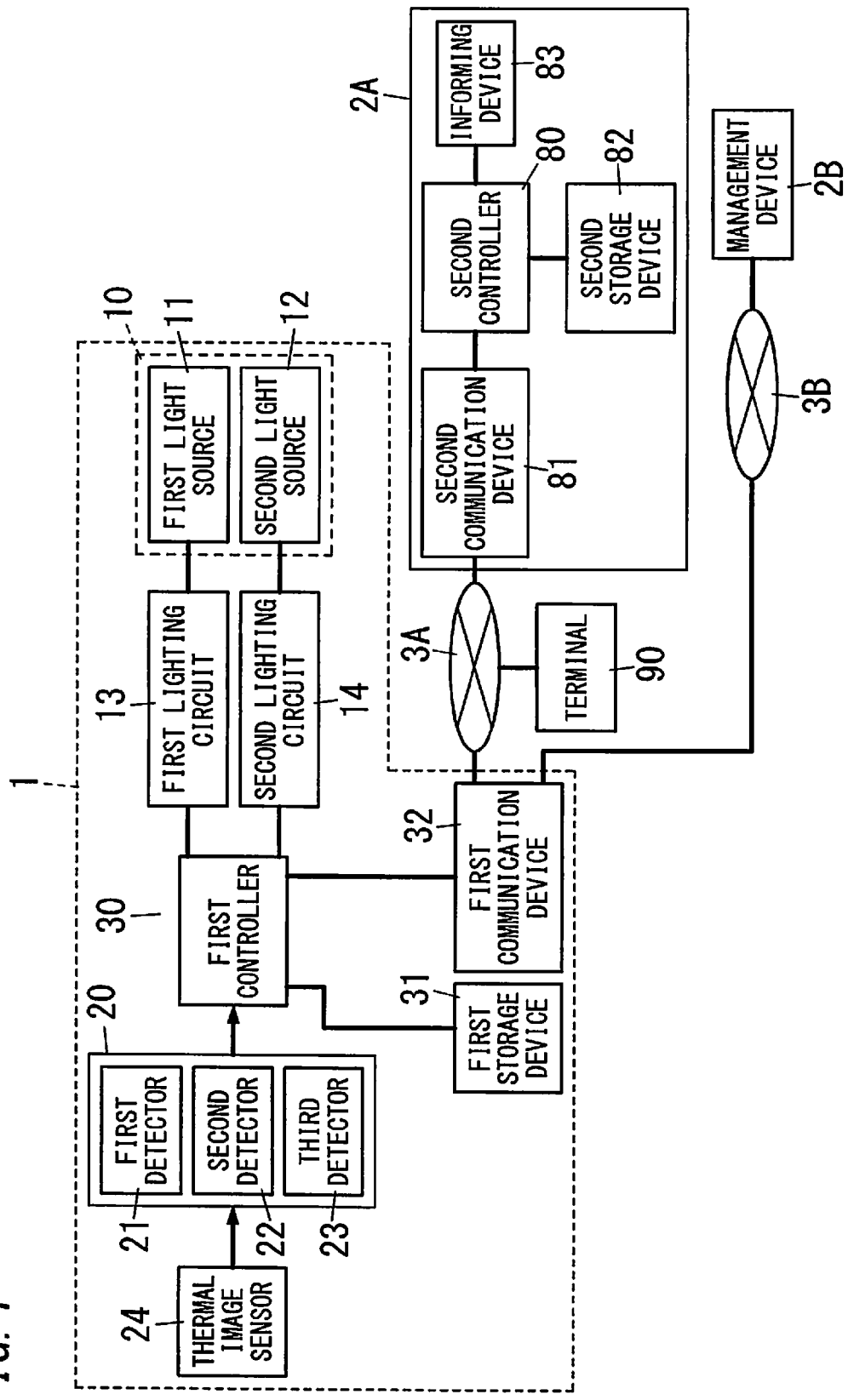
FIG. 1 is a block diagram of a behavior management system in an embodiment.

FIG. 1 shows a block diagram of the behavior management system configured to utilize a lighting system. In the embodiment, the behavior management system further includes management devices 2A and 2B, and includes lighting systems 1 that are each installed to the showcases 50. Hereinafter, one of the lighting systems 1 is explained, and like explanation of the other is omitted. The lighting system 1 includes a light source 10, a first detector 21, a second detector 22, a first controller 30 and a first communication device 32 (an output device). The lighting system 1 further includes a third detector 23, a first lighting circuit 13, a second lighting circuit 14 and a first storage device 31.

The light source 10 is configured to light a display space 61 and a passage space 62. In the embodiment, the light source 10 includes a first light source 11 configured to mainly light the display space 61, and a second light source 12 configured to mainly light the passage space 62.

The first light source 11 is a linear light source including light-emitting diodes that are linearly arranged, and is placed along a width direction of the showcase 50. A lighting area A1 of the first light source 11 (see FIG. 2B) is set to a front area of the display space 61 (a side of the passage space 62). In order to direct attention of a human in the passage space 62 to articles 70, vertical illuminance to the articles 70 needs to be increased. It is therefore preferable that front sides of the articles 70 be lit from top to bottom thereof at a uniform illumination level. The front sides of the articles 70 are regions thereof which can be seen from a human in the passage space 62. It is also preferable that light distribution of the first light source 11 be set so as to prevent output light of the first light source 11 from directly entering eyes of a human looking at some articles 70. Therefore, the first light source 11 is configured to emit light diagonally downward from a front side of the articles 70 to light articles 70 such that a human in front of the first showcase 50 can easily recognize characters or graphics depicted in the articles 70 or the articles 70 themselves displayed on the showcase 50. In the embodiment, the first light source 11 is formed of light-emitting diodes. It is preferable that the first light source 11 be formed of a light source configured to emit light having a high color temperature and high color rendering property. For example, electroluminescence devices or a fluorescent lamp(s) may be used for the first light source 11.

The second light source 12 is a linear light source including light-emitting diodes that are linearly arranged, and is placed along the width direction of the showcase 50. A lighting area A2 of the second light source 12 (see FIG. 2B) is set to part of the passage space 62 (a region near to the display space 61). However, the lighting area A2 of the second light source 12 may be a whole of the passage space 62 in a case where the passage space 62 has a comparatively narrow wide. In order that a human in the passage space 62 can easily recognize an article 70 that is taken in hand from articles 70 displayed on the showcase 50, horizontal illuminance to the article 70 needs to be increased. Therefore, the second light source 12 is configured to emit light downward from an upper side of the article 70 to light the article 70 such that a human in front of the first showcase 50 can easily recognize characters or graphics depicted in an article 70 or the article 70 itself taken in hand from the articles displayed on the showcase 50. In the embodiment, the second light source 12 is formed of light-emitting diodes. It is preferable that the second light source 12 be formed of a light source configured to emit light having a high color temperature and high color rendering property. For example, electroluminescence devices or a fluorescent lamp(s) may be used for the second light source 12.

Returning to FIG. 1, the first lighting circuit 13 is configured to supply electric power to the first light source 11 to operate the first light source 11.

The second lighting circuit 14 is configured to supply electric power to the second light source 12 to operate the second light source 12.

A human detector 20 is configured to detect a human based on a thermal image obtained from a thermal image sensor 24, and includes the first, second and third detectors 21, 22 and 23. The thermal image sensor 24 is a sensor configured to measure temperature distribution in an imaging area to output a measured result as a thermal image. For example, the thermal image sensor 24 is configured to capture an image of a floor side area including the display space 61 and the passage space 62 from an upper side thereof at prescribed intervals to sequentially supply a thermal image data to the human detector 20. As long as the thermal image sensor 24 can capture an image, of an area in which human presence or absence should be detected, from a place higher than a human, the thermal image sensor 24 may be housed in a body of a luminaire (see FIG. 3) or attached to a ceiling, a wall or the showcase 50. In the embodiment, the showcase 50 is substantially provided with the lighting system 1 including the thermal image sensor 24, the human detector 20 and the like.

The first detector 21 has a detection area set to the passage space 62 facing the display space 61. In a case where the passage space 62 has a width that allows humans to pass therethrough in opposite directions, the first detector 21 may have a detection area B2 that is part of the passage space 62 nearer to the showcase 50 as shown in FIG. 2A. The first detector 21 is configured to detect human presence or absence in the detection area B2 based on the thermal image captured through the thermal image sensor 24.

The second detector 22 is configured to detect whether a human stops in or passes through the detection area B2 that is the same as that of the first detector 21 based on the thermal image captured through the thermal image sensor 24.

The third detector 23 is configured to detect human presence or absence (presence or absence of part of a human body) in a detection area B1 that is set to an area nearer to articles 70 on the showcase 50 than the detection area B2 based on the thermal image captured through the thermal image sensor 24. The detection area B1 for the third detector 23 is set so that when a human passes through the passage space 62, the human is not detected by the third detector 23. In FIG. 2A, the detection area B1 is set to an area that is an opposite side of an inclined plane from the passage space 62, where the inclined plane extends upward from a border between the display space 61 and the passage space 62 on the floor and is slightly inclined forward.

The first controller 30 is configured to control outputs (output levels) of the first and second lighting circuits 13 and 14 based on detection results of the human detector 20 (the first, second and third detectors 21, 22 and 23), thereby controlling light outputs of the first and second light sources 11 and 12.

The first controller 30 and the human detector 20 can be realized by a microcomputer and embedded program to be executed by the microcomputer.

The first communication device 32 is configured to communicate with management devices 2A and 2B. The management device 2A is installed in the store, and members of store staff or the like can use the management device 2A in order to manage customer behaviors. The first communication device 32 is connected to the management device 2A in the store via an intranet 3A, and both of them are configured to mutually perform data transmission via a cable LAN or a wireless LAN or by power line carrier communication. The management device 2B is connected to lighting systems installed in stores. In this case, the management device 2B is installed outside the stores, and is used for managing customer behaviors in the stores. For examples, in a case where the embodiment is applied to franchise member stores (franchisees), each store is provided with a management device 2A for managing customer behaviors thereof, while the management device 2B for managing customer behaviors in the stores is installed in a headquarter (a franchiser). The management device 2B is configured to communicate with a first communication device 32 of each store via the Internet 3B.

The embodiment includes a device body 40A attached to a top of the showcase 50. The device body (luminaire body) 40A houses a light source 10, a human detector 20, a first controller 30, a first lighting circuit 13 and a second lighting circuit 14. The light sources 10, first detectors 21 and second detectors 22 of the human detectors 20, the first controllers 30 and the device body 40A constitute a luminaire.

Figure 2C:
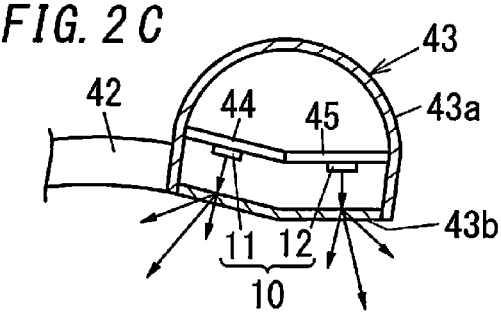
FIG. 2C is a sectional view of a light source in the behavior management system.
Figure 3:
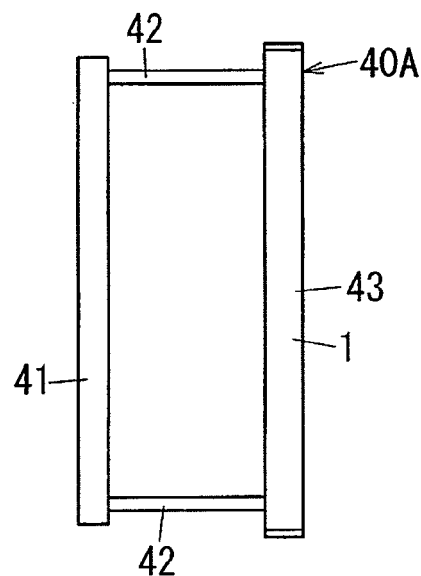
FIG. 3 is an external view of a luminaire in the behavior management system.

As shown in FIGS. 2A to 3, the device body 40A is attached to the top of the showcase 50. FIG. 3 illustrates an appearance of the device body 40A seen from a bottom side thereof. The device body 40A is used for the showcase 50, and includes a base 41, two arms 42 and a lamp body 43. A device body for the showcase set further includes two arms 42 and a lamp body 43 for another showcase 50. Hereinafter, the device body 40A for the showcase 50 is explained, and like explanation about the two arms 42 and the lamp body 43 for another showcase 50 is omitted.

The base 41 is attached to top ends of the pillar members 51 at both ends so as to form a bridge.

Base sides of the two arms 42 are each extended upward from both ends of the base 41 in the width direction of the showcase 50. Tip sides of the arms 42 have the same shape as seen from one side of the width direction of the showcase 50, and are each curved so that the tip sides more project forward as the tip sides are more apart from the base 41. The lamp body 43 is joined to the tips of the arms 42, and is supported by the base 41 through the arms 42.

As shown in FIG. 2C, the lamp body 43 includes a case 43a that has a lower opening and extends in the width direction of the showcase 50, and a light-transmitting cover 43b that closes the lower opening of the case 43a. Circuit boards 44 and 45 extend in the width direction of the showcase 50 and are housed in the case 43a. The light-emitting diodes constituting the first light source 11 are mounted on a lower surface of the circuit board 44 (a first circuit board) so as to have regular spaces between them in the width direction of the showcase 50. The light-emitting diodes constituting the second light source 12 are mounted on a lower surface of the circuit board 45 (a second circuit board) so as to have regular spaces between them in the width direction of the showcase 50. In order to allow the second light source 12 to emit light downward, the second circuit board 45 is housed in the case 43a so that the second circuit board 45 becomes horizontal with the light-emitting surface thereof facing downward when the device body 40A is attached to the showcase 50. In order to allow the first light source 11 to emit light diagonally downward, the first circuit board 44 is housed in the case 43a so that the first circuit board 44 is inclined with respect to a horizontal plane with the light-emitting surface thereof facing diagonally downward when the device body 40A is attached to the showcase 50. Thus, since the first and second light sources 11 and 12 have light-emitting directions that are set to downward directions, it is possible to suppress the possibility that light emitted from each of the first and second light sources 11 and 12 enters human eyes, thereby preventing glare and reducing an unfavorable influence onto the atmosphere of the store space.

For example, the light source 10 including the second light source 12 is placed at a height of about 200 cm from the floor 100 based on an adult average height so that from a near place the second light source 12 can light an article 70 which a human P1 in the passage space 62 takes in hand. Since the lamp body 43 including the light source 10 is attached to the top of the showcase 50, it is possible to reduce a distance between the articles 70 and the light source 10 to reduce luminous flux of the light source 10 in comparison with a case where the light source 10 is placed on the ceiling 101 that is equal to or higher than 3 m. As a result, energy consumption can be reduced. In the embodiment, the lamp body 43 housing the light source 10 is installed above the showcase 50, but the installation location thereof is not limited to this. In a case where the height of the showcase 50 is high, the light source 10 may be installed at a position of the showcase 50 of which height from the floor 100 is equal to or lower than 200 cm and higher than the average height.

A control operation of the lighting system is explained. In an initial state when the lighting system starts operating, if a thermal image is supplied from the thermal image sensor 24 to the human detector 20, the human detector 20 stores the thermal image in the initial state as a background image into a memory (an internal memory or an external memory). In the initial state, the human detector 20 detects human absence in the display space 61 and the passage space 62, and sets, to "0", the number of humans in each of a first region and a second region that are previously set in the thermal image. Here, the first region corresponds to the third detection area B1, while the second region corresponds to the first and second detection regions B2. That is, the second region (B2) is an area for detecting human presence or absence in the passage space 62. The first region (B1) is an area that is nearer to the articles 70 displaced in the display space 61 than the second region (B2).

In the initial state, if the human detector 20 detects human absence in both of the first and second regions, the first controller 30 operates the first and second light sources 11 and 12, based on detection results of the human detector 20, at a more reduced level in comparison with a case where human presence is detected. Thus, in the case of human absence, the first and second light sources 11 and 12 are lit at a reduced dimming level, thereby reducing power consumption.

Subsequently, the human detector 20 periodically receives a thermal image from the thermal image sensor 24 to calculate a difference image between the thermal image from the thermal image sensor 24 and the background image stored in the memory and then to generate a binary image (a black and white image) by binarizing the difference image with a prescribed threshold. The human detector 20 has upper and lower limits with respect to a size (a human body size) that is previously derived from a thermal image including a human based on conditions such as an installation location of the thermal image sensor 24, an angle for capturing a thermal image and average physique. From the binary image, the human detector 20 extracts (at least) a pixel region formed of pixels which are different from the background image to detect human presence if a size of the pixel region is equal to or larger than the lower limit and equal to or smaller than the upper limit. If the human detector 20 detects human presence, the human detector 20 determines that the pixel region representing human presence is in any one of the first and second regions or in both of them. If the pixel region is in not both of them but the second region, the human detector 20 measures a detection time representing continuously human presence. The background image captured in the initial state during human absence may be continue to be used, or the background image may be periodically renewed If a human comes in the passage space 62, the first detector 21 detects human presence in the second region to supply a detection signal (a first detection signal) representing human presence in the second region to the first controller 30. If receiving the detection signal from the first detector 21, the first controller 30 stores, into the first storage device 31, the detection signal from the first detector 21 (information obtained from the detection signal) along with date and time information obtained from a built-in clocking function (not shown) and an identification number allocated to the showcase 50, which are associated with the detection signal.

If a human P1 stops in the passage space 62, the second detector 22 detects a human stopping in the second region. If a detection time representing human presence is equal to or larger than a reference value (e.g., 5 seconds), the second detector 22 determines that a human stops in the second region, and then supplies the first controller 30 with a detection signal (a second detection signal) representing that a human stops in the second region. If receiving the detection signal from the second detector 22, the first controller 30 supplies the first lighting circuit 13 with a control signal for increasing an optical output of the first light source 11. If receiving the control signal, the first lighting circuit 13 increase electric power supplied to the first light source 11, thereby increasing the optical output of the first light source 11. Thus, if the optical output of the first light source 11 is increased, the attention of a human (a customer) in the passage space 62 can be directed to articles 70 displayed on the display space 61 because the articles 70 are lit brightly. In addition, if receiving the detection signal from the second detector 22, the first controller 30 stores, into the first storage device 31, the detection signal from the second detector 22 (information obtained from the detection signal) along with date and time information obtained from the built-in clocking function and the identification number allocated to the showcase 50, which are associated with the detection signal. As an example, when increasing the optical output of the first light source 11, the first controller 30 may increase the optical output while changing a color temperature of the optical output from a low color temperature to a high color temperature.

If a human P1 in the passage space 62 stretches one's hand to take an article 70 displayed on a shelf board 53 of the showcase 50, part of a human body enters the first region. If detecting part of the human body in the first region, the third detector 23 supplies the first controller 30 with a detection signal (a third detection signal) representing presence of part of a human body in the first region. If receiving the detection signal from the third detector 23, the first controller 30 determines that the human P1 stretches one's hand into the display space 61 to take the article 70, and then controls an output (an output level) of the second lighting circuit 14 to increase the optical output of the second light source 12. In this case, the optical outputs of the first and second light sources 11 and 12 are increased in comparison with a case where presence of a human and part of a human body is not detected. As a result, the lighting areas A1 and A2 are lit brightly. Therefore, the article 70 taken in one's hand is lit brightly by light emission of the second light source 12, and can be accordingly easy to see. In addition, if receiving the detection signal from the third detector 23, the first controller 30 stores, into the first storage device 31, the detection signal from the third detector 23 (information obtained from the detection signal) along with date and time information obtained from the built-in clocking function and the identification number allocated to the showcase 50, which are associated with the detection signal. As an example, when increasing the optical output of the second light source 12, the first controller 30 may increase the optical output while changing a color temperature of the optical output from a low color temperature to a high color temperature.

If a predetermined time elapses from a point in time at which input of the detection signal from the third detector 23 has come to a stop, the first controller 30 controls the output (the output level) of the second lighting circuit 14 to decrease the optical output of the second light source 12 from a second dimming level to a first dimming level. It is preferable that when decreasing the optical output of the second light source 12, the first controller 30 gradually change a color temperature of the optical output from a high color temperature to a low color temperature at a speed such that the change in the optical output is imperceptible and the atmosphere of the store is not spoiled.

Subsequently, if the human P1 in the passage space 62 moves outside the second region B2, all of the first, second and third detectors 21, 22 and 23 come to detect human absence, so that the human detector 20 stops supplying any detection signal to the first controller 30. Thus, if a predetermined time elapses from a point in time at which the human detector 20 stops supplying any detection signal to the first controller 30, the first controller 30 controls the output (the output level) of the first lighting circuit 13 to decrease the optical output of the first light source 11. It is preferable that when decreasing the optical output of the first light source 11 from the second dimming level to the first dimming level, the first controller 30 gradually change the optical output at a speed such that the change in the optical output is imperceptible and the atmosphere of the store is not spoiled. As an example, when decreasing the optical output of the first light source 11, the first controller 30 may decrease the optical output while changing a color temperature of the optical output from the high color temperature to the low color temperature.

As stated above, if receiving a detection signal from a first, second or third detector 21, 22 or 23, the first controller 30 controls the optical output of the light source 10 and stores, into the first storage device 31, the detection signal (information obtained from the detection signal) along with date and time information and the identification number allocated to the showcase 50 which are associated with the detection signal.

That is, histories of detection results by the human detector 20 are stored in the first storage device 31. The first controller 30 transmits the histories of detection results stored in the first storage device 31 to the management devices 2A and 2B through the first communication device 32 at every specified interval (e.g., at every 10 minutes).

In a case where, within a specified interval, the human detector 20 detects human presence in the second region without detecting human stop and detects human absence in the first region, first, second and third count values are set to one time, zero and zero, respectively. The first count value corresponds to the number of times of detection by the first detector 21. The second count value corresponds to the number of times of detection by the second detector 22. The third count value corresponds to the number of times of detection by the third detector 23.

In a case where within a specified interval the human detector 20 detects human presence in the second region continuously for a time interval that is equal to or larger than a reference value and detects human presence in the first region, each of the first, second and third count values is set to one time.

In a case where within a specified interval the human detector 20 detects human presence in the second region three times and determines that in one of them a human stops, and detects human presence in the first region one time, the first, second and third count values are set to three times, one time and one time, respectively.

The management device 2A includes a second controller 80, a second communication device 81, a second storage device 82 and an informing device 83. The management device 2B includes the same configuration as the management device 2A, and accordingly like explanation about the management device 2B is omitted.

The second controller 80 is formed of a microcomputer (a processor), and configured to perform overall control of the management device 2A.

The second communication device 81 (an input device) is configured to perform data communication with the first communication device 32 of the lighting system 1 through the intranet 3A and receive histories of detection results supplied from the first communication device 32 of the lighting system 1. In the embodiment, the second communication device 81 is configured to perform data communication with a first communication device 32 of each lighting system 1 and receive histories of detection results from a first communication device 32 of each lighting system 1.

The second storage device 82 stores histories of detection results received from each lighting system 1 through the second communication device 81 in accordance with data readout or writing control by the second controller 80. The histories are formed of histories from the lighting systems 1 (the showcases 50), and histories from one (each) lighting system 1 includes a history (a first history) obtained from a first detector 21, a history (a second history) obtained from a second detector 22 and a history (a third history) from a third detector 23. Each of the first to third histories is a data set of which data includes a detection signal (information obtained from the detection signal), date and time information as detection date and time of human presence and an identification number allocated to the showcase 50 associated with human presence. In the embodiment, the showcases 50 are arranged in the store, and display locations of products (articles 70) are determined in accordance with kinds of the products (articles 70). Accordingly, the second storage device 82 stores a registration data set each of which data includes: an identification number of a showcase 50; and an identification number and a name of a product classification (a classification of an article 70), which are associated with each other. In addition, the second storage device 82 stores a previously registered layout drawings including the showcases 50 in the store and a data set each of which data includes a position of a showcase 50 in a layout drawing, an identification number of the showcase 50, and product classifications (identification numbers and names) of articles 70 displayed on the showcase 50, which are associated with each other.

The informing device 83 is configured to display information to be notified on a display device (not shown) provided for the management device 2A by characters or images, or to output information to be notified by voice from a speaker (not shown) provided for the management device 2A. In addition, the informing device 83 is configured to transmit information to be notified by a terminal 90 to the terminal 90 from the second communication device 81 through the intranet 3A, thereby allowing the terminal 90 to display the information thereon by characters or images or to output the information by voice. The terminal 90 is a tablet terminal attached to a showcase 50 or the like.

If histories of detection results are transmitted from a first communication device 32 in a lighting system 1 at every specified interval, the second communication device 82 receives the histories of detection results and the second storage device 82 stores the histories. The second storage device 82 includes storage areas allocated to respective showcases 50, and stores histories of detection results about each of the showcases 50 in the old order of date and time information. For example, if an administrator operates the management device 2A to input a display period that is a period from a first date and time to a second date and time newer than that, the second controller 80 obtains histories of detection results in the display period from the second storage device 82 to supply the histories to the informing device 83. The informing device 83 creates a table as shown in TABLE 1 based on the histories of detection results in the display period, where ID NO. is an identification number of a showcase 50, PRODUCT CL ID NO. is an identification number of a product classification, and PRODUCT CL NAME is a name of the product classification.

TABLE 1

| ID NO. | PRODUCT CL ID NO. | PRODUCT CL NAME | FIRST COUNT VALUE | SECOND COUNT VALUE | THIRD COUNT VALUE |
| --- | --- | --- | --- | --- | --- |
| 1 | A1 | SHAMPOO | 1 | 0 | 0 |
| 2 | | | 5 | 5 | 3 |
| 3 | A2 | SOAP | 1 | 0 | 0 |
| 4 | | | 1 | 0 | 0 |
| 5 | A3 | LADIES COSMETICS | 1 | 0 | 0 |
| 6 | | | 1 | 0 | 0 |
| 7 | | | 2 | 1 | 0 |
| 8 | | | 1 | 1 | 0 |

TABLE 1-continued

| ID NO. | PRODUCT CL ID NO. | PRODUCT CL NAME | FIRST COUNT VALUE | SECOND COUNT VALUE | THIRD COUNT VALUE |
|---|---|---|---|---|---|
| 9 | A4 | MENS | 1 | 1 | 0 |
| 10 | | COSMETICS | 1 | 0 | 0 |
| 11 | A5 | COMMODITY | 5 | 3 | 1 |
| 12 | | | 5 | 2 | 0 |
| 13 | A6 | BEVERAGE | 2 | 1 | 1 |
| 14 | | | 3 | 1 | 1 |
| . | . | . | . | . | . |
| . | . | . | . | . | . |
| . | . | . | . | . | . |
| n | | | 0 | 0 | 0 |

For example, TABLE 1 is created by calculating a sum of first count values, a sum of second count values and a sum of third count values in the display period about each of the showcases 50. The informing device 83 allows the display device of the management device 2A and/or a terminal 90 to display the created table. However, the informing device 83 calculates each sum of the first, second and third count values in the display period based on the histories, but may perform calculation except for calculation for each sum of the first to third count values. For example, the informing device 83 may calculate individual sums of the first to third count values in a desired time period (time unit, day unit, month unit) to compare the individual sums with those in other time period. Alternatively, the informing device 83 may create an image for comparing calculation results obtained from first to third count values in the store with calculation results obtained from first to third count values in another store, and allow the display device of the management device 2A and/or a terminal 90 to display the image. The informing device 83 may also create an image for comparing calculation results obtained from first to third count values in an arbitrary area of areas in the store with calculation results obtained from first to third count values in another arbitrary area of the areas, and allow the display device of the management device 2A and/or a terminal 90 to display the image.

Thus, since information to be notified is output from the management device 2A and/or a terminal 90 based on histories of detection results of the first to third detectors 21 to 23 in the display period, members of store staff can grasp customer behavior (human behavior) from the information. For example, a showcase 50 scoring a large first count value can be judged to have a high frequency that customers pass through the passage space 62 in front of the showcase 50. The showcase 50 can be accordingly judged to be in a place having excellent visibility on line of flow in the store and a high convenience of movement. A showcase 50 scoring a large second count value has a large number of times customers stay (stop) in front of the showcase 50. The articles 70 displayed on the showcase 50 can be judged to have high attraction to customers. A showcase 50 scoring a large third count value has the large number of times customers extend their hands to articles 70 displayed on the showcase 50. Accordingly, the articles 70 can be judged to have high purchasing rate. Thus, members of store staff can monitor a state in the store from the table representing histories of detection results in the display period, analyze customer's behavior, and grasp customer's degree of interest with respect to articles 70 displayed on each showcase 50. In addition, members of store staff can collect objective data about customer's behavior based on detection results by the human detector 20, and improve layout (shelving allocation, POP, illumination of each showcase, and the like) by analyzing the data. Members of store staff can also improve layout of the store by objectively comparing the store with another store in the same trading area.

Even in the management device 2B provided outside the store, information based on histories of detection results from each lighting system 1 of stores is provided. Members of the headquarter can review layout of each store or articles 70 to be supplied to each store by considering information displayed based on histories of detection results about the stores or comparing a store with other store.

Figure 4:
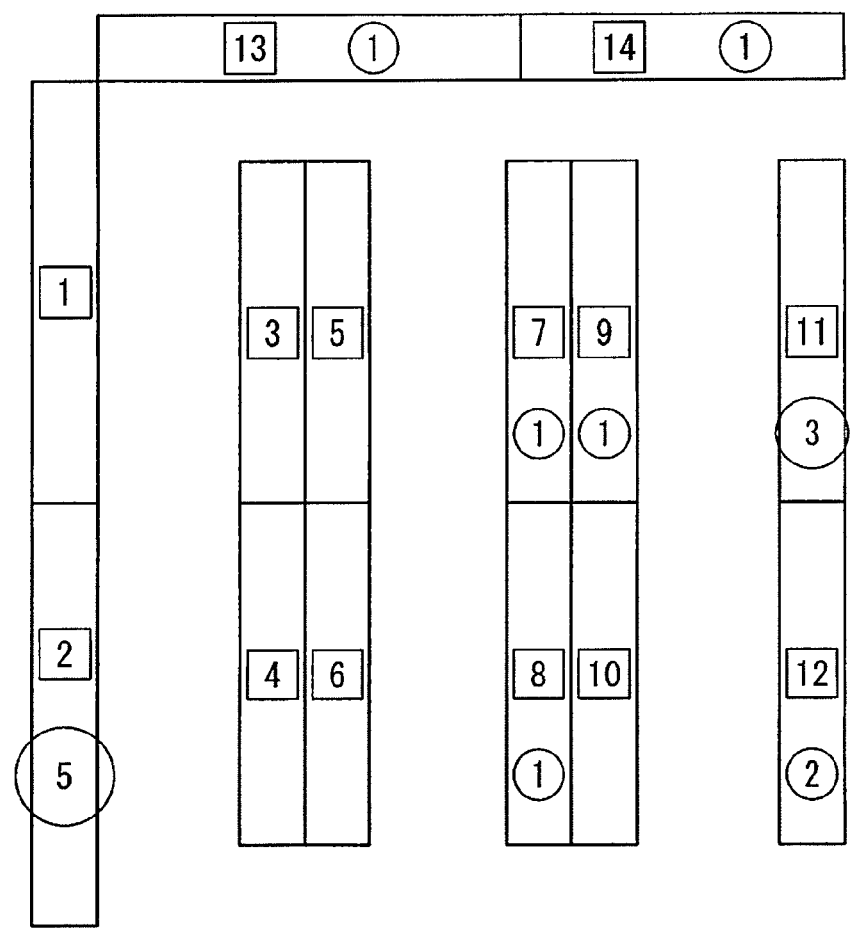
FIG. 4 is a view illustrating an informing screen displayed by a management device in the behavior management system.

As an example, the informing device 83 may create an image in which each information to be notified based on histories of detection results is displayed at a position of a corresponding detection place, and allow the display device of the management device 2A and/or a terminal 90 to display the image. FIG. 4 is an example of an image displayed on a terminal 90. A layout drawing (a plan view) of showcases 50 as shown in FIG. 4 includes individual rectangular frames which each represent showcases 50, and identification numbers which are allocated to the respective showcases 50 and individually surrounded by a square in a corresponding rectangular frame. FIG. 4 also includes numbers which are individually surrounded by a circle in a rectangular frame representing a corresponding showcase 50, and each of the numbers represents a third count value. Each radius of the circles surrounding respective third count values becomes larger as its own third count value is larger. Accordingly, places of larger third count values can be more easily grasped in vision.

The behavior management system of the embodiment includes one or more lighting systems 1. For example, the lighting system 1 in FIG. 1 includes a light source 10, a first detector 21, a second detector 22, a first controller 30 (a controller), a first storage device 31 (a storage device) and a first communication device 32 (an output device). The light source 10 is configured to light a display space 61 for displaying articles 70 and a passage space 62 facing the display space 61. The first detector 21 is configured to detect human presence or absence in the passage space 62. The second detector 22 is configured to detect whether a human passes through or stops in the passage space 62. The first controller 30 is configured to control the light source 10 based on detection results by the first and second detectors 21 and 22. A first storage device 31 is configured to store a history of detection results by the first detector 21 and a history of detection results by the second detector 22. The first communication device 32 is configured to supply a management device 2A, 2B with the histories of detection results stored in the first storage device 31.

In order to control an optical output of the light source 10, the lighting system 1 includes the first detector 21 configured to detect human presence or absence in the passage space 62 and the second detector 22 configured to detect whether a human passes through or stops in the passage space 62. In the behavior management system, the lighting system 1 outputs the histories of detection results by the first and second detectors 21 and 22. Therefore, human behavior in the passage space can be managed based on the histories of detection results from the lighting system 1. According to the behavior management system, human behavior in facilities can be grasped at low cost by utilizing the first and second detectors in the lighting system 1 without installing an additional sensor in order to detect human behavior.

In the behavior management system, it is preferable that the lighting system 1 further include a third detector 23 configured to detect human presence or absence (presence or absence of part of a human body) in a detection area that is nearer to the articles 70 than a detection area of the first detector 21 in the passage space 62. The first storage device 31 is configured to further store a history of detection results by the third detector 23. The first communication device 32 is configured to supply the management device 2A, 2B with the history of detection results by the third detector 23 stored in the first storage device 31 along with the history of detection results by the first detector 21 and the history of detection results by the second detector 22.

The third detector 23 can detect behavior that a human in the passage space 62 extends one's hand to an article 70 displayed in the display space 61. The management device 2A, 2B can grasp the behavior based on the history of detection results by the third detector 23.

In the behavior management system, it is preferable that the management device 2A, 2B include a second communication device 81 (an input device) configured to receive the histories of detection results from the first communication device 32 and an informing device 83 configured to notify information based on the histories of detection results received through the second communication device 81.

It is possible to grasp human behavior in facilities based on the information notified by the informing device 83 of the management device 2A, 2B. The behavior management system can be utilized for layout modification in facilities or the like.

In the behavior management system, the informing device 83 may be configured to display a layout drawing in which the passage space 62 and the display space 61 are illustrated according to their positions, and also display respective information to be notified based on the histories of detection results received through the second communication device 81 at respective positions corresponding to the detection areas in the layout drawing.

Thus, by displaying respective information to be notified in the layout drawing in which the passage space 62 and the display space 61 are illustrated, it is possible to visually grasp whether each information to be notified is information about any position in the display space 61 or the passage space 62.

It is preferable that the behavior management system further include a terminal 90. The terminal 90 is placed in the display space 61 and configured to notify information on articles 70 displayed in the display space 61. The terminal 90 is formed of, for example, a tablet terminal and stores position information of a showcase 50 to which the terminal 90 is installed, information of articles 70 to be displayed on the showcase 50, and information of other articles which is associated with the articles 70. The second detector 22 is configured to supply a detection signal to the first controller 30 if detecting a human stopping in the passage space 62. The first controller 30 is configured to transmit, through the first communication device 32, a control signal for allowing a corresponding terminal 90 to start notification operation if receiving the detection signal from the second detector 22. The first communication device 32 and the terminal 90 are connected to an intranet 3A. The first communication device 32 is configured to transmit the control signal to the terminal 90 via the intranet 3A. The terminal 90 is configured, if receiving the control signal transmitted from the first communication device 32, to start notifying, by video or audio, information about the articles 70 displayed on the showcase 50 and other articles associated with the articles 70 based on the control signal. The information on the articles 70 can be provided to a human stopping in the passage space 62. The terminal 90 is configured to automatically stop the notification operation if a specified time elapses from a point in time at which the control signal is received. Accordingly, power consumption can be reduced. Preferably, when stopping the notification operation, the terminal 90 is configured to perform a fadeout operation to gradually decrease sound volume at a speed such that the change in sound volume is imperceptible. For example, customers in a store can be prevented from having a sense of discomfort.

Since the terminal 90 can provide a human stopping in the passage space 62 with information on the articles 70 and other articles associated with the articles 70, customer's purchase motivation can be enhanced.

In the above-mentioned embodiments, a luminaire installed in each showcase 50 includes a human detector 20 and a first controller 30, but one first controller 30 may be configured to control two or more luminaires. Each of a first detector 21, a second detector 22 and a third detector 23 may have a detection area covering display and passage spaces 61 and 62 of two or more showcases 50. If the second detector 22 detects a human stopping in the passage space 62, the first controller 30 increases an optical output of a first light source 11 for lighting the display space 61 of the showcases 50 facing a human detection area thereof. If the third detector 23 detects part of a human body in the display space 61, the first controller 30 increases an optical output of a second light source 12 for lighting the passage space 62 facing a detection area of the part of the human body. In this case, the first controller 30 stores each address information of first and second light sources 11 and 12, and installation location associated with each address information.

In the above-mentioned embodiments, a human detector 20 is configured to detect human presence or absence and detect a human stopping in a passage space 62 based on a thermal image obtained from a thermal image sensor 24, but a sensor for detecting a human is not limited the thermal image sensor 24. For example, an image sensor for capturing a visible light image may be used in order to detect human presence or absence and also detect whether or not a human stops based on an image captured by the image sensor. Examples of the image sensor for capturing a visible light image include a CCD (Charge Coupled Device) image sensor, and a CMOS (Complementary Metal Oxide Semiconductor) image sensor. The number of thermal image sensors 24 or image sensors may be one or more. Preferably, the number of the thermal image sensor 24 or the image sensor is set to a quantity required for detection areas to be captured.

As an example, a human detector 20 may be configured to detect human presence or absence in the first and second regions and also detect whether a human passes through or stops in the second region based on detection results of pyroelectric infrared detectors each having detection areas covering the first and second regions. Alternatively, in place of the infrared detector, the human detector 20 may be configured to detect human presence or absence in the first and second regions and also detect whether a human passes through or stops in the second region based on a detection result of an ultrasonic sensor, a microwave sensor or a sonic sensor.

In the above-mentioned embodiments, a behavior management system is applied to a retail store such as a convenience store or the like, but may be applied to a library, a book store, an art gallery or a museum. In an art gallery or a museum, if a switch for reproducing a voice guide near an exhibit(s) is provided, a third detector 23 may be configured to detect an operation for turning on the switch.

In an embodiment, a behavior management system includes at least one lighting system 1 and a management device 2A, 2B. The lighting system 1 includes a light source 10, a first detector 21, a second detector 22, a third detector 23, a controller 30, a first storage device 31 and a first communication device 32. The light source 10 includes a first light source 11 configured to mainly light a side of a display space 61 for displaying articles 70, and a second light source 12 configured to mainly light a side of a passage space 62 facing the display space 61. The first detector 21 is configured to detect human presence or absence in a first detection area B2 that contains at least part of the passage space 62 on a side of the display space 61, and then to output a detection result. The second detector 22 is configured to detect whether a human passes through or stops in a second detection area that contains at least part of the passage space 62 on the side of the display space 61, and then to output a detection result. For example, the second detection area is the same as the first detection area B2. The third detector 23 is configured to detect presence or absence of part of a human body in a third detection area B1 that is set to an area nearer to the side of the display space 61 than the first and second detection areas, and then to output a detection result. The controller 30 is configured to control the light source 10 based on the detection results by the first to third detectors 21 to 23. The first storage device 31 is configured to store a first history including detection results obtained from the first detector 21, a second history including detection results obtained from the second detector 22, and a third history including detection results obtained from the third detector 23. The first communication device 32 is configured to output the first to third histories stored in the first storage device 31.

The management device 2A, 2B includes a second communication device 81, a second storage device 82 and an informing device 83. The second communication device 81 is configured to receive the first to third histories from the first communication device 32. The second storage device 82 is configured to store the first to third histories, and renew the stored first to third histories so that the first to third histories received through the second communication device 81 are added to the stored first to third histories, respectively. The informing device 83 is configured, based on the renewed first to third histories in the second storage device 82, to provide information obtained at least from a number of first detection results, a number of second detection results and a number of third detection results. Each of the first detection results is a detection result representing that human presence in the first detection area B2 was detected. Each of the second detection results is a detection result representing that a human stop in the second detection area B2 was detected. Each of the third detection results is a detection result representing that presence of part of a human body in the third detection area B1 was detected.

In an example of the embodiment, the behavior management system includes, as the at least one lighting system 1, lighting systems each attached to showcases 50 as shown in FIG. 4. The second storage device 82 is configured to store and renew first to third histories with respect to each of the showcases 50. As shown in TABLE 1, the informing device 83 is configured, based on renewed first to third histories with respect to each of the showcases 50 in the second storage device 82, to provide information obtained at least from the number of first detection results (FIRST COUNT VALUE), the number of second detection results (SECOND COUNT VALUE), and the number of third detection results (THIRD COUNT VALUE) with respect to each of the showcases 50.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A behavior management system, comprising at least one lighting system that comprises:
   a light source configured to light a display space for displaying articles and a passage space facing the display space, one showcase being at a side of the display space that faces the passage space;
   a sensor which has a sensing area that is set to a floor side area including the display space and the passage space from an upper side of the one showcase, and which is configured to output data sensed from the sensing area;
   a first detector configured to detect human presence or absence in a first detection area that contains at least part of the passage space on a side of the display space based on the data from the sensor, and then to output a detection result;
   a second detector configured to detect whether a human passes through or stops in a second detection area that contains at least part of the passage space on the side of the display space based on the data from the sensor, and then to output a detection result;
   a third detector configured to detect presence or absence of at least part of a human body in a third detection area that is set to a nearer side to shelf boards, with which the one showcase is provided, than the first and second detection areas based on the data from the sensor, and then to output a detection result;
   a controller configured to control the light source based on the detection results by the first, second and third detectors;
   a storage device configured to store a history of detection results by the first detector, a history of detection results by the second detector and a history of detection results by the third detector; and
   an output device configured to supply a management device with the history of detection results by the third detector stored in the storage device along with the history of detection results by the first detector and the history of detection results by the second detector stored in the storage device.

2. The behavior management system of claim 1, further comprising the management device that comprises:
   an input device configured to receive histories of detection results supplied from the output device; and
   an informing device configured to notify information based on the histories of detection results received through the input device.

3. The behavior management system of claim 2, wherein the informing device is configured:
   to create an image for displaying a layout drawing in which the passage space and the display space are illustrated according to their positions, and displaying respective information to be notified based on the histories of detection results received through the input device at respective positions corresponding to the detection areas in the layout drawing; and to notify the information by the image.

4. The behavior management system of claim 1, further comprising the management device, wherein the light source comprises a first light source configured to mainly light a side of the display space, and a second light source configured to mainly light a side of the passage space, and the lighting system comprises, as the storage device and the output device, a first storage device and a first communication device, respectively, wherein the management device comprises:

a second communication device configured to receive the first to third histories from the first communication device;

a second storage device configured to store the first to third histories, and renew the stored first to third histories so that the first to third histories received through the second communication device are added to the stored first to third histories, respectively; and an informing device configured, based on the renewed first to third histories in the second storage device, to provide information obtained at least from a number of detection results by the first detector each of which is a first detection result representing that human presence in the first detection area was detected, a number of detection results by the second detector each of which is a second detection result representing that a human stop in the second detection area was detected, and a number of detection results by the third detector each of which is a third detection result representing that presence of part of a human body in the third detection area was detected.

5. The behavior management system of claim 4, comprising, as said at least one lighting system, lighting systems each attached to showcases, wherein the second storage device is configured to store and renew first to third histories with respect to each of the showcases, and the informing device is configured, based on renewed first to third histories with respect to each of the showcases in the second storage device, to provide information obtained at least from a number of first detection results, a number of second detection results and a number of third detection results with respect to each of the showcases.

* * * * *